US005375775A

United States Patent [19]
Keller et al.

[11] Patent Number: 5,375,775
[45] Date of Patent: Dec. 27, 1994

[54] TIRE RECYCLING APPARATUS AND METHOD

[76] Inventors: Mark E. Keller, 9889 Moate Rd., Durand, Ill. 61024; LaVerne E. Keller, 5872 Winnebago Rd., Pecatonica, Ill. 61063

[21] Appl. No.: 109,737

[22] Filed: Aug. 20, 1993

[51] Int. Cl.5 .................................. B02C 23/20
[52] U.S. Cl. ...................... 241/19; 241/101.4; 241/186.35; 241/223; 241/242; 241/DIG. 31
[58] Field of Search ............. 241/15, 17, 18, 24, 241/49, 60, 101.4, 19, 186.35, 222, 223, 242, 293, DIG. 14, DIG. 31, 66, 67

[56] References Cited

U.S. PATENT DOCUMENTS

| | | | |
|---|---|---|---|
| 3,922,942 | 12/1975 | Fawcett et al. | 83/620 |
| 4,015,782 | 4/1977 | Granite | 241/DIG. 31 X |
| 4,119,277 | 10/1978 | Snyder et al. | 241/186.35 X |
| 4,174,074 | 11/1979 | Geiger | 241/67 X |
| 4,205,799 | 6/1980 | Brewer | 241/243 |
| 4,221,341 | 9/1980 | Schymura et al. | 241/67 |
| 4,394,983 | 7/1983 | Ulsky | 241/243 |
| 4,560,112 | 12/1985 | Rouse et al. | 241/236 |
| 4,576,339 | 3/1986 | Snyder et al. | 241/120 |
| 4,607,800 | 8/1986 | Barclay | 241/159 |
| 4,625,924 | 12/1986 | Killinger | 241/223 X |
| 4,632,318 | 12/1986 | Hyuga | 241/223 X |
| 4,684,070 | 8/1987 | Dickey | 241/79.3 |
| 4,684,071 | 8/1987 | Dickey | 241/80 |
| 4,854,508 | 8/1989 | Dickey | 241/236 |
| 4,927,088 | 5/1990 | Brewer | 241/233 |
| 4,948,056 | 8/1990 | D'Errico | 241/67 |
| 4,967,626 | 11/1990 | Doster et al. | 83/124 |
| 4,973,003 | 11/1990 | Chen | 241/67 X |
| 4,976,178 | 12/1990 | Barclay | 83/19 |
| 4,989,305 | 2/1991 | Pole et al. | 241/293 |
| 5,024,386 | 6/1991 | Morris | 241/3 |
| 5,100,069 | 3/1992 | Barclay | 241/236 |
| 5,115,983 | 5/1992 | Rutherford, Sr. | 241/DIG. 31 X |
| 5,127,588 | 7/1992 | Schmidt | 241/97 |
| 5,169,078 | 12/1992 | Lamar | 241/222 |

FOREIGN PATENT DOCUMENTS

| | | | |
|---|---|---|---|
| 2479024 | 10/1981 | France | 241/223 |
| 150534 | 9/1981 | Germany | 241/223 |

OTHER PUBLICATIONS

Blueprint, A-American Machine and Assembly Col, drawing of prior art apparatus.

Primary Examiner—Timothy V. Eley
Attorney, Agent, or Firm—Lathrop & Clark

[57] ABSTRACT

A transportable machine reduces vehicle tires to a fine powder size suitable for incorporation into new articles of manufacture. An upper infeed assembly is mounted to a frame above a spring-loaded upwardly biased lower infeed assembly. A splayed tire is fed between guiderails on the upper and lower guide assembles and is driven along by upper drive sprockets and rides on lower idler sprockets. The tire is fed by a tire-feed positioned above a cutter bar and biased downwardly to clamp a cut splayed tire against the cutter bar and to feed the tire over the bar and into cutter blades mounted on a rotary blade assembly. The rotary blade assembly has a shaft mounted for rotation about an axis to the frame and has a plurality of cutter blades spaced about the shaft periphery. Each rotary cutter blade has a saw-toothed profile with triangular teeth. The tips or the moving blades are slightly spaced from the cutting edge formed on the fixed cutter bar. The fixed blade assembly cutter bar has a cutting edge parallel to and beneath the axis of the rotary blade shaft.

28 Claims, 11 Drawing Sheets

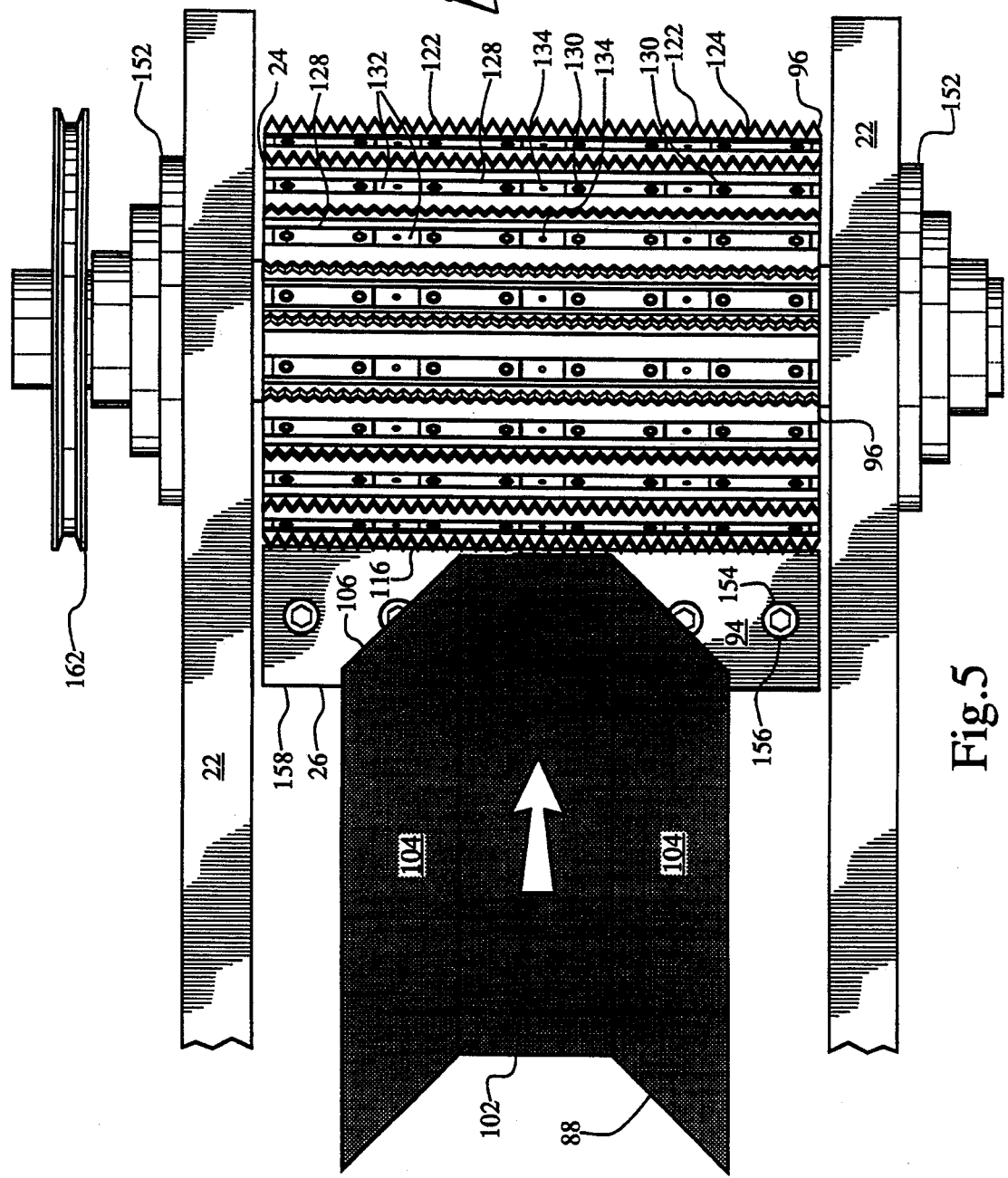

TIRE RECYCLING APPARATUS AND METHOD

FIELD OF THE INVENTION

This inventions relates to apparatus and methods for recycling tires in general and to methods and apparatus employing a moving blade opposed to a fixed blade in particular.

BACKGROUND OF THE INVENTION

Tires present a difficult recycling problem. The desirability of recycling is matched by the difficulty of achieving the desired reuse. By some estimates, over a million tires a day are discarded in the United States alone. Landfill disposal of tires has never been a particularly desirable option because the lightweight tires tend to rise to the surface through the overburden. Landfill disposal of tires is becoming even less feasible with the spiraling increase in landfill use charges. Further, many communities are mandating that inherently recyclable products such as tires not be allowed in landfills. Open air storage and stockpiling of tires is dangerous and undesirable. A large stack of discarded tires represents a considerable risk to the pubic safety and health. A large tire fire can be difficult to fight and produces intense air polluting smoke. Mosquitoes may breed in water which collects on the inside of the tires and can spread diseases such as malaria, yellow lever, and spinal meningitis.

Because of the low density of unprocessed waste tires, the cost of transportation to a centralized processing facility can be prohibitive. Most solutions to the disposal of tires have centered around creating a mobile machine for cutting or shredding tires so they may more economically be transported and disposed of. Although the uses of used tires are many, they have not yet proven sufficient to solve the disposal problem. The key to finding more uses for tires involves finer and finer shredding or grinding of the tires. Large, one to two inch chunks of tires may be burned in some coal-fired utility boilers. Granulated tires may be made into playground coverings or added to asphalt paving. If the tires are reduced to a fine powder, they may be directly recycled in new rubber products.

Tires, by their very nature, have been designed to resist cutting and abrasion, and thus can be difficult and costly to reduce to a fine powder. Abrasive grinding of tires has not proven feasible, as the resulting heat tends to ignite the tires.

One known apparatus which shreds tires into small pieces is fed tires which have been cut in half diametrically. The tire segments are flattened out and with the treadside up are fed across a non-moving blade which interdigitates with a plurality of rotating blades. Still, such a tire recycling apparatus requires further steps to reduce the tire to the fine powder required for incorporation into new products. Many types of tire recycling apparatus are know which cut tires into pieces from one eighth of an inch across to four inches across. Quarter inch and eighth inch size particles may be recycled into play ground surfaces. However, such pieces are too large for use in rubber end products such as mud flaps and bridge abutments. Larger pieces must first be fed through a granulator to achieve a desired fine particle size.

What is needed is a readily transportable apparatus which directly converts tires to a fine powder suitable for use in new products.

SUMMARY OF THE INVENTION

The tire recycling apparatus of this invention is a machine which reduces a wide range of tires to a fine powder size suitable for incorporation into new articles of manufacture. The apparatus processes tires which have been cut on a diagonal across the tread and sidewalls so that when the tire is splayed fat, it has the appearance of arrow leathering. The apparatus is comprised of a frame on which is mounted an upper infeed assembly which is fixed to the frame and consists of three chain-driven shafts. Located on each shalt are eight sprocket wheels for gripping and driving tires forward. Five guiderails are spaced between the sprocket wheels.

A lower infeed assembly is mounted to the frame by four spring-loaded mounts which bias the lower infeed assembly against the upper infeed assembly. The lower infeed assembly has three idler shafts. On each idler shaft are eight idler sprockets. Spaced between the sprockets are five lower guiderails. The lower guiderails are opposed to the upper guiderails. The lower idler shafts and idler sprockets are offset from and spaced between the upper drive shafts and drive sprockets. When a splayed tire is fed between the guiderails, it is driven along by the upper drive sprockets and rides on the lower sprockets.

The tire is fed by a tire-feed positioned above a cutter bar and biased downwardly to clamp a cut splayed tire against the cutter bar and to feed the tire over the bar and into cutter blades mounted in a rotary blade assembly. The rotary blade assembly has a shall mounted to the frame for rotation about a horizontal axis. The rotary blade assembly has a plurality of cutter blades spaced about the periphery of the shaft. Each cutter blade of the rotating blade assembly has a saw-toothed profile with triangular teeth. The teeth have points at the tips of the triangles and teeth rooks between the triangles. The tips of the moving blades are slightly spaced from the fixed cutting edge of the cutter bar. The rotary blade assembly has an even number of cutter blades positioned around the shaft. Alternate cutter blades are offset along the axis of the shaft by half a triangular blade width. The blades thus form triangular cuts in a tire as it is fed into the rotary blade. The cuts are one-half the width of each triangular blade.

The fixed blade assembly has a cutter bar which has a cutting edge parallel to the axis of the rotary blade shaft, and which is offset downwardly so that a tangent to the rotary blade assembly at a line along which the cutter bar and cutter blades are opposed is sloped from the vertical. The upper surface of the cutter bar over which a tire is led is in a plane which passes through the axis of the rotary blade assembly.

The shaft on which the moving blades are mounted has a central cavity extending through the axis of the shaft and passageways which extend between the central cavity and the outer perimeter of the cutter shaft. The central cavity is filled with water. The water is pumped by the centrifugal force of the rotation of the rotary blade assembly through the passageways to provide cooling and lubrication to the rotary and fixed blade assemblies.

The frame defines a box substantially closed off from the atmosphere by plates. The bottom of the box is formed by a conveyor belt which extends from front to back and from side to side of the frame. The conveyor belt removes tire fines as they are moved by gravity to the bottom of the box.

A fan communicates with the box and the fan produces a negative air pressure within the box. The tan draws air into an air cleaner for purifying the air removed from the box.

It is an object of the present invention to provide a tire recycling apparatus which reduces tires to a fine powder suitable for further processing and recycling.

It is an additional object of the present invention to provide a tire recycling apparatus which reduces tires to a desired granular size in a single grinding operation.

It is another object of the present invention to provide a tire recycling apparatus incorporating air pollution emission controls.

It is a further object of the present invention to provide a tire regrinding apparatus which may be readily moved from one site to another.

It is also an object of the present invention to provide a tire recycling apparatus that can accommodate a wide range of tire sizes and shapes.

It is yet another object of the present invention to provide a tire regrinding apparatus which employs water for cooling and dust control.

Further objects, features and advantages of the invention will be apparent from the following detailed description when taken in conjunction with the accompanying drawings.

BRIEF DESCRIPTION OF THE DRAWINGS

FIG. 5 is a top view, broken away, of the rotary blade assembly and fixed blade assembly of the apparatus of FIGS. 1A–1B.

FIG. 6 is an enlarged, isometric view of a single rotary cutter blade.

DESCRIPTION OF THE PREFERRED EMBODIMENT

Figure 7:
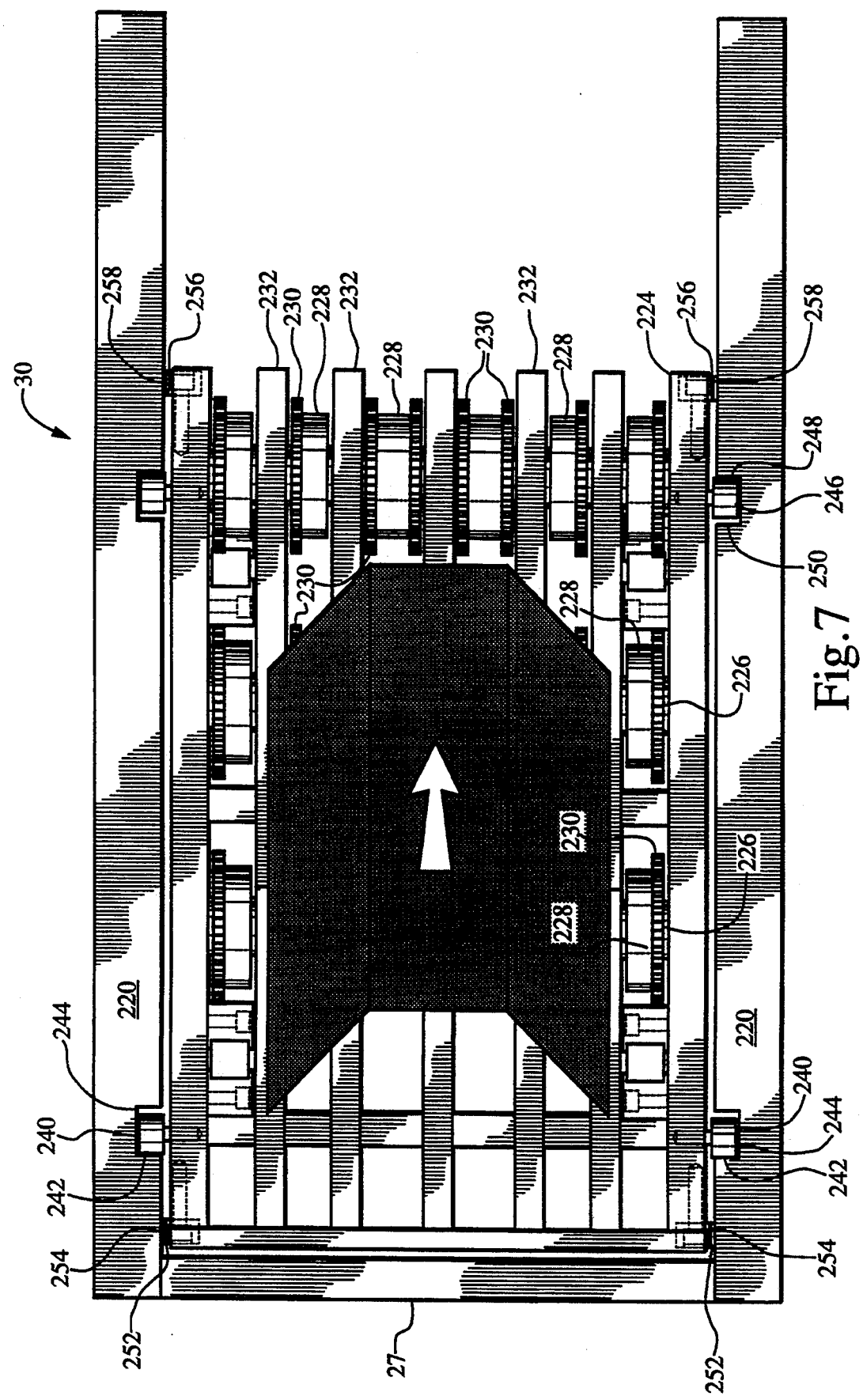
FIG. 7 is a top view of the bottom infeed assembly.
Figure 8:
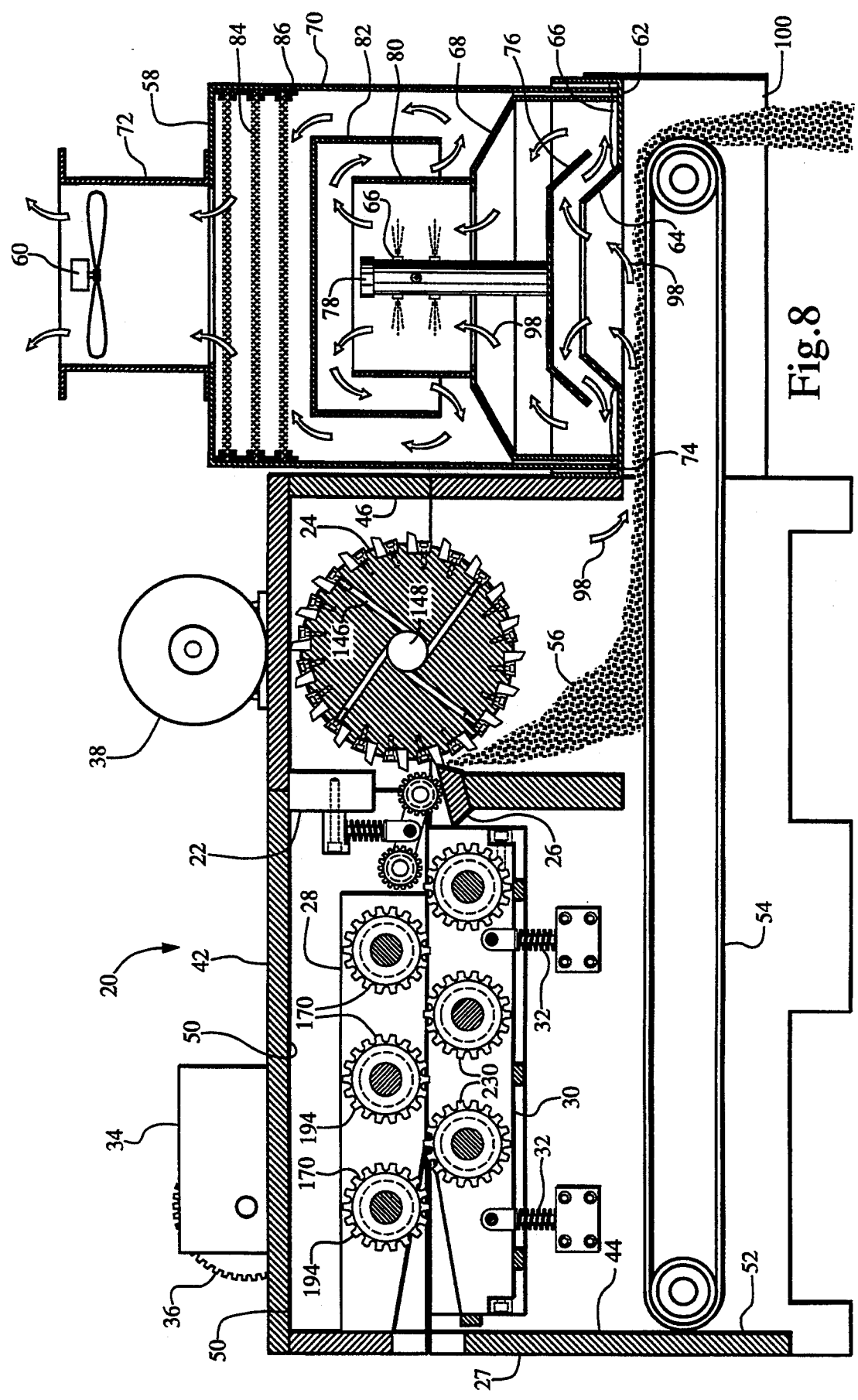
FIG. 8 is a side-elevational schematic view in cross-section of the apparatus of FIGS. 1A–1B, including an air filter device.

Referring more particularly to FIGS. 1A–9, wherein like numbers refer to similar parts, a tire recycling apparatus 20 is shown in FIG. 8. The apparatus 20 has a frame 22. A rotary blade assembly 24 and a fixed blade assembly 26 are mounted to the frame 22 and cooperate to finely shred tires for recycling. The apparatus 20 has a tire infeed end 27 which includes an upper infeed assembly 28 and a lower infeed assembly 30. The upper infeed assembly 28 is rigidly mounted to the frame 22. The lower infeed assembly is mounted on springs 32 which resiliently bias the lower assembly 30 against the upper assembly 28.

Figure 3A:
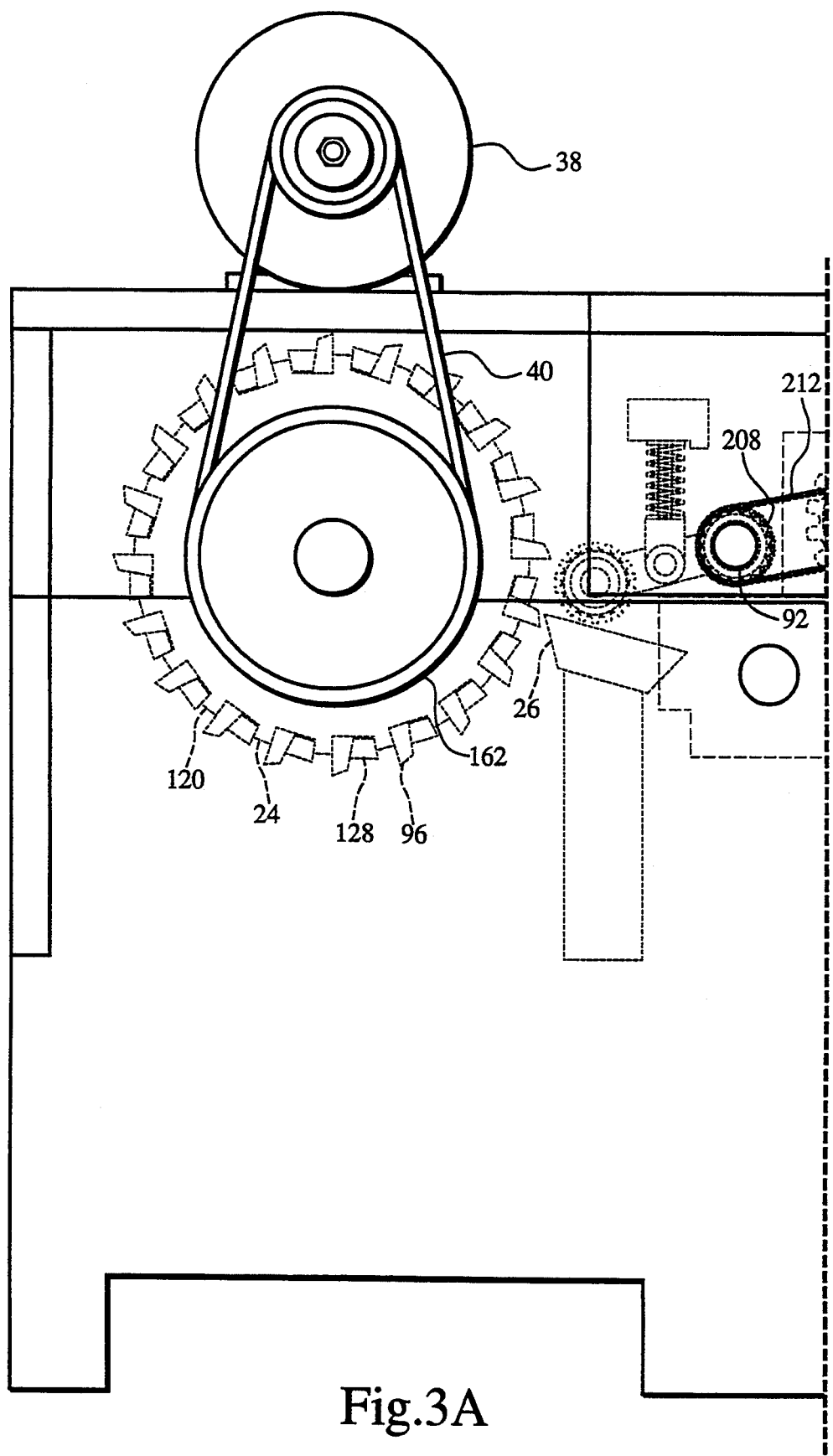
FIG. 3A is a side-elevational view of the rear of the apparatus shown in FIGS. 1A and 1B.
Figure 3B:
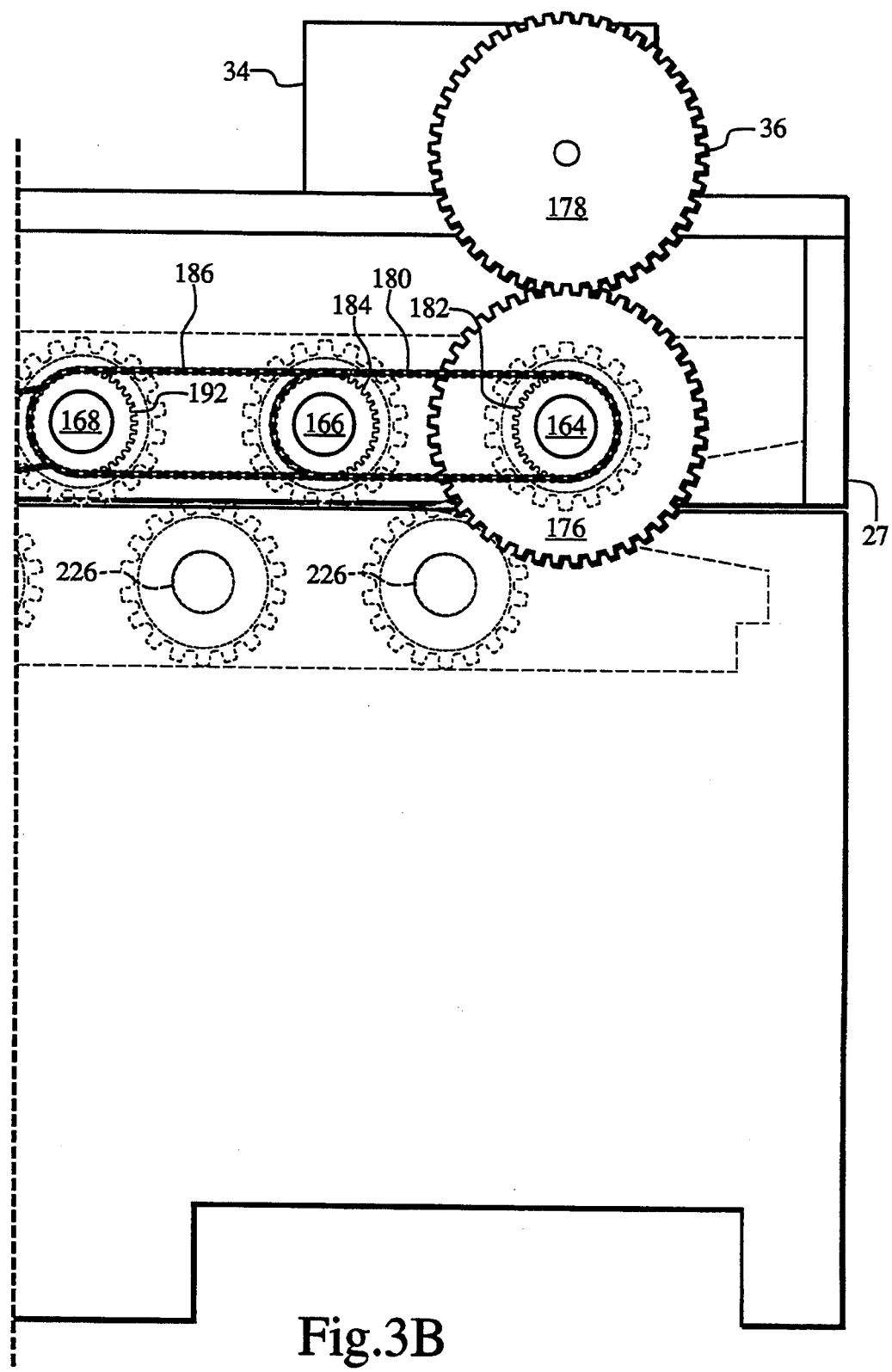
FIG. 3B is a side elevational view of the front of the apparatus of FIG. 3A.

The upper infeed assembly 28, as best shown in FIG. 3B, is driven by a high-torque, low-speed DC motor 34 through a gear train and chain drive 36.

As best shown in FIG. 3A, the rotary blade assembly 24 is driven by an AC motor 38 through a belt drive 40. The frame 22 in conjunction with top plates 42, front plates 44, rear plates 46, and side plates 48 forms an enclosed box 50. In a preferred embodiment, the box 50 is approximately two feet wide and four feet high and six to eight feet long. The bottom 52 of the box 50 is sealed off by a conveyor belt 54, best shown in FIG. 8. To more effectively seal the bottom of the box, the edges of the conveyor belt may be received within generally horizontal slob cut in the side plates 48. The conveyor belt transports tire fines 56 underneath an air cleaner 58 and out of the tire recycling apparatus 20 for collection and further processing.

Although very small particles of rubber are desirable for reprocessing, excessive smoke and rubber dust particles should be removed from any air exhausted into the vicinity. The air cleaner 58 communicates directly with enclosed box 50 and achieves desired levels of air cleanliness. The air cleaner has a fan 60 which draws air through the air cleaner 58 and creates a negative pressure within the enclosed box 50.

The air cleaner 58 is comprised of a pan 62 mounted to the frame 22. The pan 62 has an upraised frustoconical inlet 64 which serves to retain spray water 66. A water spray assembly 68 rests in the pan 62. A filter assembly 70 surrounds and encloses the water spray assembly 68. A fan assembly 72 is mounted to the filter assembly 70 and encloses the fan 60.

The filter assembly 70 and the spray assembly 68 are sealed at their lower edges 74 by spray water 66 in the bottom of the pan 62. The pan 62 has a drain (not shown) which prevents the level of spray water 66 in the pan 62 from rising above the inlet 64.

The spray water assembly 68 contains a lower baffle 76 which is mounted beneath a water spray bar 78 which extends vertically upwardly within the spray water assembly 68. The spray bar extends from a lower baffle 76 which is contained within the spray water assembly 68. The lower baffle 76 overlies and is spaced above the inlet 64. A generally cylindrical spray shroud 80 surrounds the spray bar and extends upwardly from the lower baffle 76. An upper baffle 82 is in the shape of an inverted cup with cylindrical walls and is mounted above the spray shroud 80. The spray shroud 80 and the upper battle 82 form a part of the outer spray assembly 68. Circular perforated baffle plates 84 are supported by brackets 86 over the upper baffle 82 and form part of the filter assembly 70.

Figure 2A:
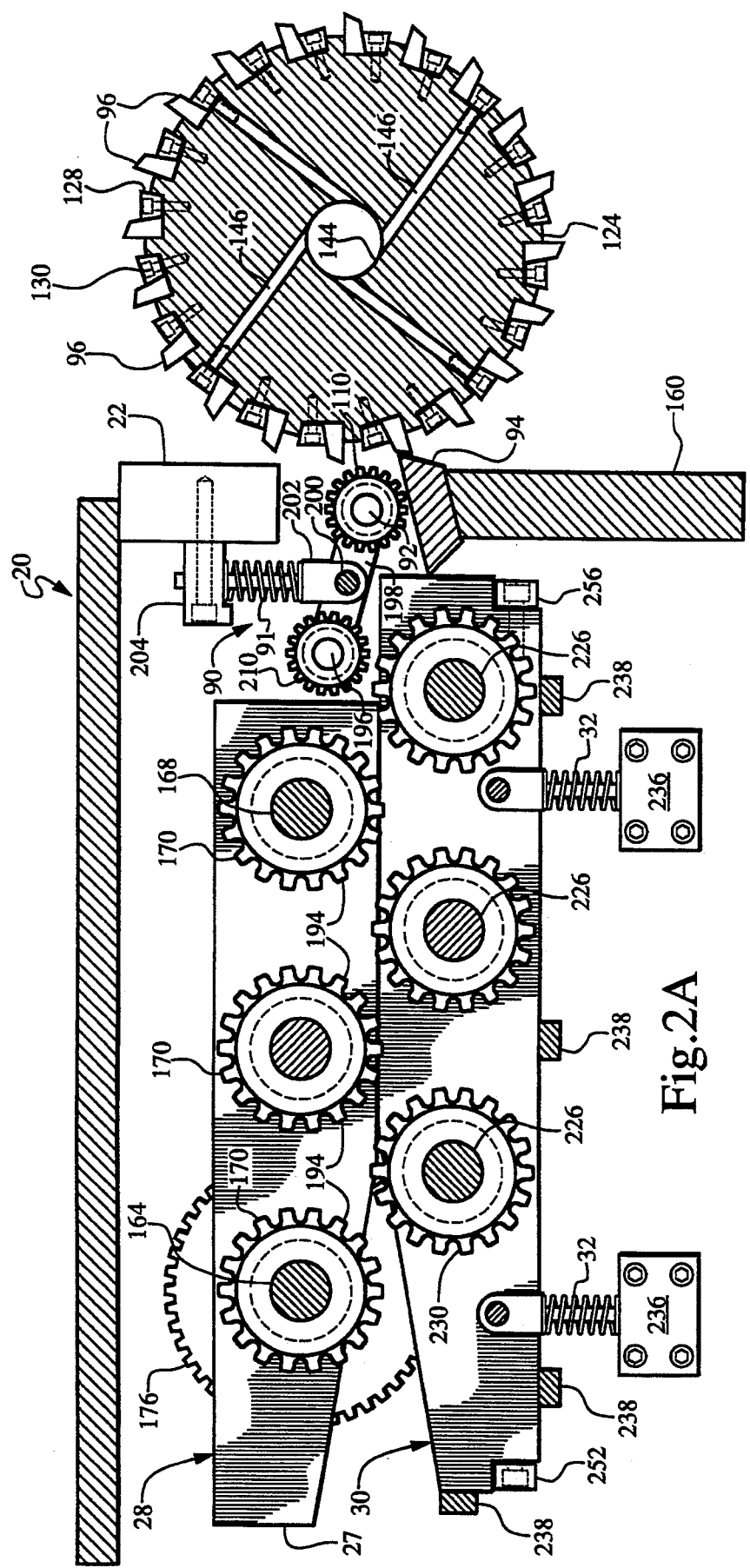
FIG. 2A is a side-elevational schematic view of the apparatus of FIGS. 1A and 1B.
Figure 2B:
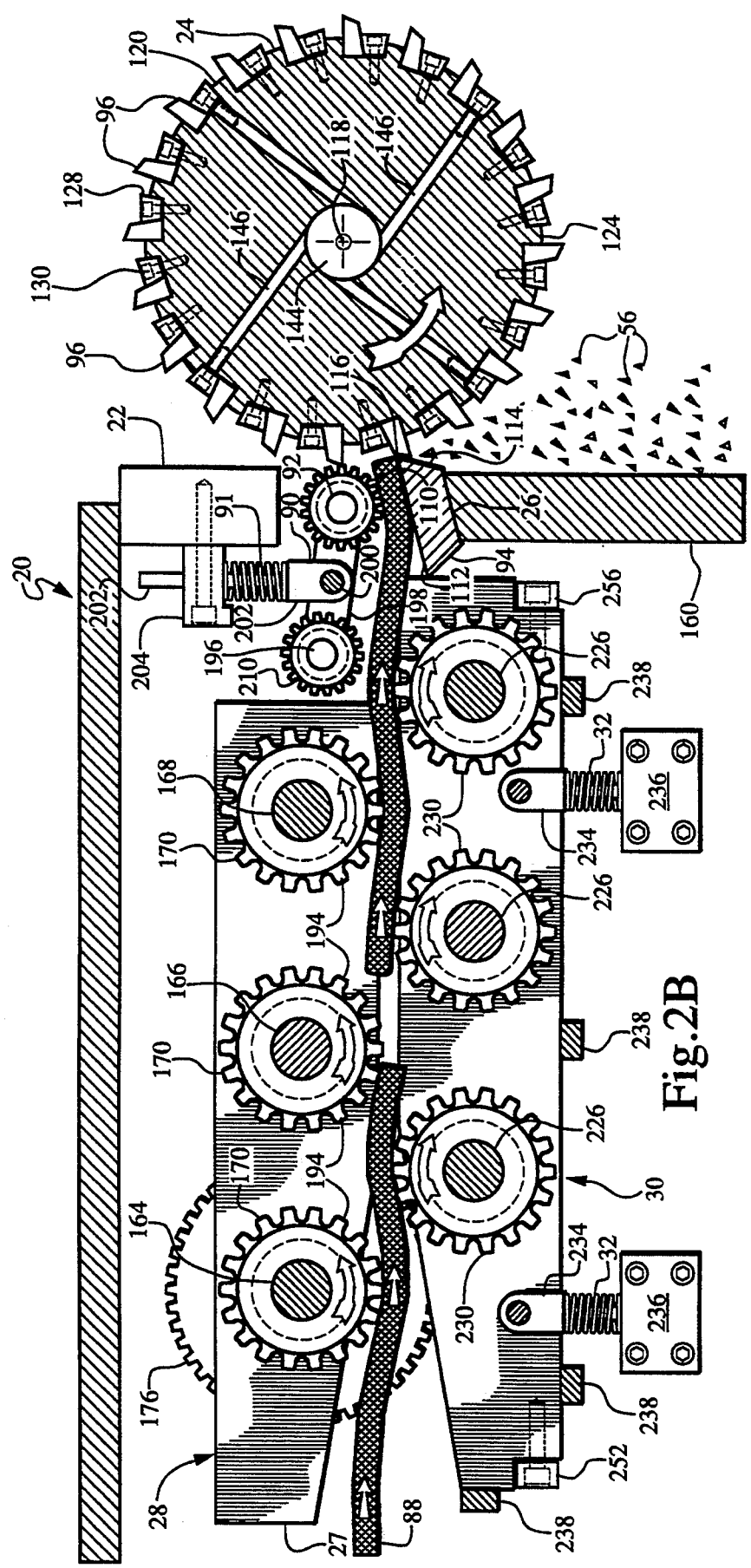
FIG. 2B is a side-elevational schematic view of the apparatus 2A, shown in operation shredding tires.

As best shown in FIG. 2B, tires 88 arc led between the upper infeed assembly 28 and the lower infeed assembly 30. A tire is clamped by a tire-feed assembly 90 which by means of a coil spring 91 biases a cutter infeed shaft 92 downwardly to engage roller sprockets 110 with hold a tire 88 to hold a tire over the cutter bar 94 of the fixed-blade assembly 26. The tire is fed into the cutter blades 96 of the rotary blade assembly 24 which shred the tire 88 into fine particulates 56, best shown in FIG. 8. The majority of the tire tines 56 fall downwardly onto the conveyor belt 54.

However, because the tire fines 56 are light, some of them are scattered over the interior box 50 formed by the frame 22. The fines 56 are prevented from escaping the box 50 by the negative air pressure produced by the fan 60 which draws air, as shown by arrows 98, from the box 50. The fines settle by gravity to the bottom 52, where the conveyor 54, which spans the entire width of the recycling apparatus 20, removes the fines 56 to the material exit 100. The pan 62 with its air-inlet 64 is mounted over the conveyor belt 54 near the material exit 100. The air cleaner assembly 58 mounted over the conveyor 54 encourages air-borne particles to move over the conveyor and to settle thereon.

Air is then drawn through the air cleaner 58, where additional fines and pollutants are washed and filtered before the air is exhausted through the fan assembly 72. Within the air cleaner 58, the air traverses a baffle formed by the inlet 64 and the lower baffle 76. The air then moves between the spray bar 78 and the spray shroud 80, where spray water 66 removes particulates and water soluble gasses from the exit air shown by arrows 98. After passing out around the spray baffle 82, the air moves through the series of baffle plates 84 which are perforated by eighth-inch holes which are off-set from each other in successive plates 84 and held in the plate-holding brackets 86. The brackets 86 space the plates 84 so that standard furnace filters may be placed therein for filtering the air.

The air cleaning assembly 58 is a simple stack of the spray water assembly 68 and the filter assembly 70. It may be readily disassembled by lifting out the pan 62 for cleaning daily or more frequently, as required.

Up to the present time, tire grinding and shredding apparatus have tended to reduce tires to chunks of an inch or more, or at most to chips which could be recycled, perhaps in asphalt paving. These were not sufficiently fine to be used in the manufacture of new rubber articles. Prior known apparatus typically required feeding tires through a series of apparatus to achieve sufficiently fine particle size. Abrading tires to reduce them to fine particulant has not proven practical because of the heat produced, which tends to produce a fire if an abrasive wheel or the like is used to comminute or grind up a tire.

The tire recycling apparatus 20 uses a unique combination of a fixed blade assembly 26 and a rotary blade assembly 24, shown in FIGS. 2B, 5 and 8.

As shown in FIG. 5, the apparatus 20 is led a splayed out tire 88. The splayed tire 88 is produced by a single-angled cut across the tube of the tire. The angled cut produces the arrow-feather appearance of the tire 88 as shown in FIGS. 4, 5, 7 and 9. The diagonal cut produces a tire 88 which has a rectangular-shaped tread portion 102, on either side of which are parallelogram sidewalls 104. The leading edge 106 of the tire forms a blunt point which may readily be fed into the infeed end 27 of the tire recycling apparatus 20.

Referring to FIG. 2B, the tire-feed assembly 90 has a cutter infeed shaft 92 on which are mounted a plurality of final infeed sprockets 110. The sprockets 110 grip the tire 88 and drive it over the top surface 112 of the cutter bar 94. A blade-forming surface 114 intersects the top surface 112 to form a cutting edge 116, best shown in FIG. 9. The cutter bar 94 top surface 112 is angled upwardly to lie in a plane which passes through the center 118 of the rotary blade assembly shaft 120. Thus, the cutter bar 94 and the cutting edge 116 formed thereon are located below a horizontal line passing through the center 118 of the rotary blade assembly shaft 120. The top surface 112 of the cutter surface thus falls away from the in-fed tire 88, and thus reduces rubbing of the moving tire against the stationary top surface.

Figure 9:
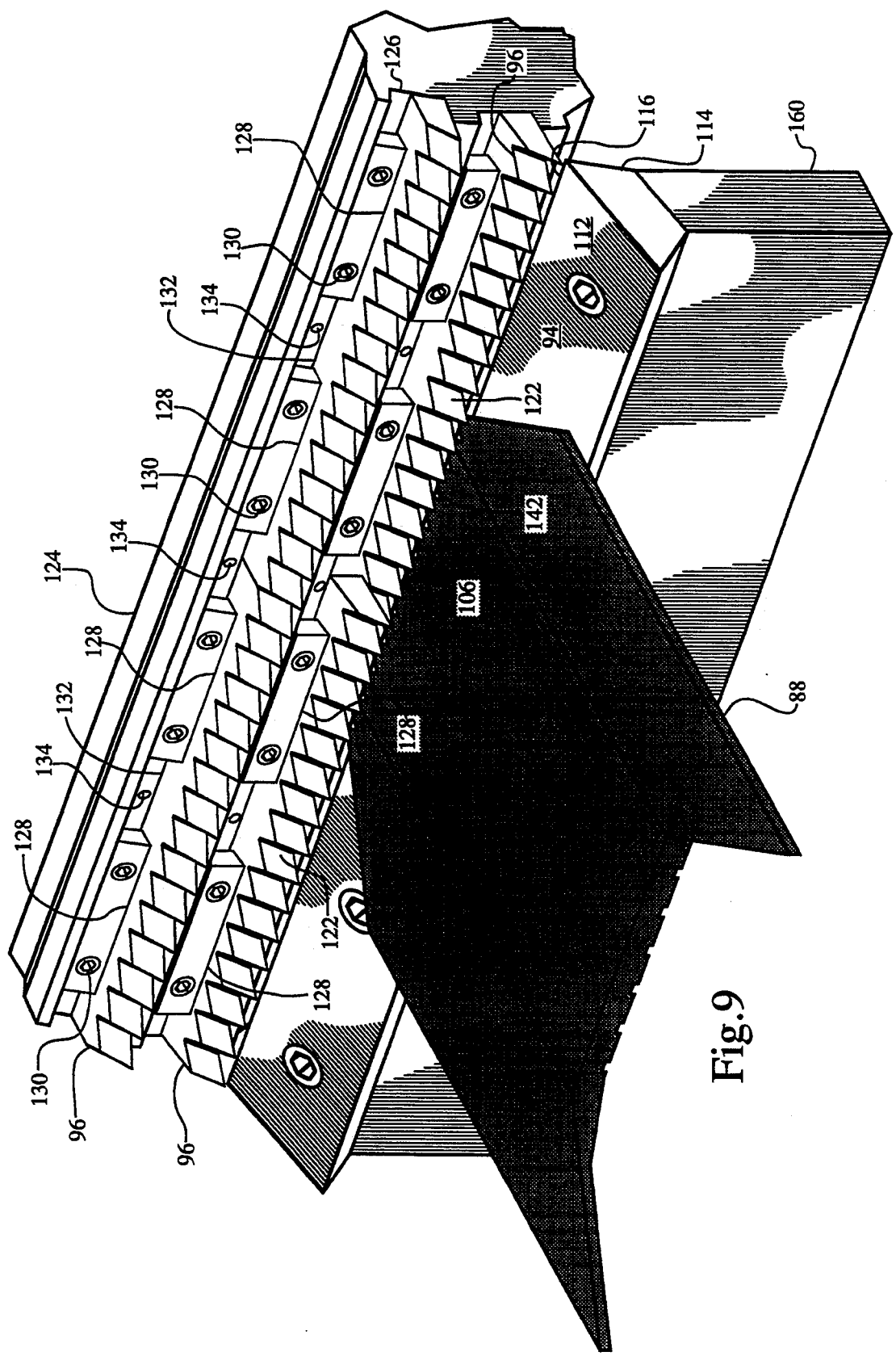
FIG. 9 is a cut-away isometric view of the interface between the rotary blade assembly and the fixed blade assembly, with a tire shown in the process of being shredded.

As best shown in FIGS. 5 and 9, the splayed tires 88 are led over the long, straight edge 116 of the cutting bar 94. The rotating cutter blades 96 do not interdigitate with the cutter bar 94, but rather stand off approximately 0.030 inches from the cutting edge 116 of the cutter bar 94.

The cutter blades 96 are broken into two segments 122 as shown in FIG. 9. Twenty sets each of two-cutter segments are spaced around the periphery 124, and are held in cutter grooves 126 by wedge-shaped locking bars 128 and allen bolts 130. Gaps 132 are left between the locking wedges 128. The gaps provide locations liar water spray nozzles 134.

Figure 1A:
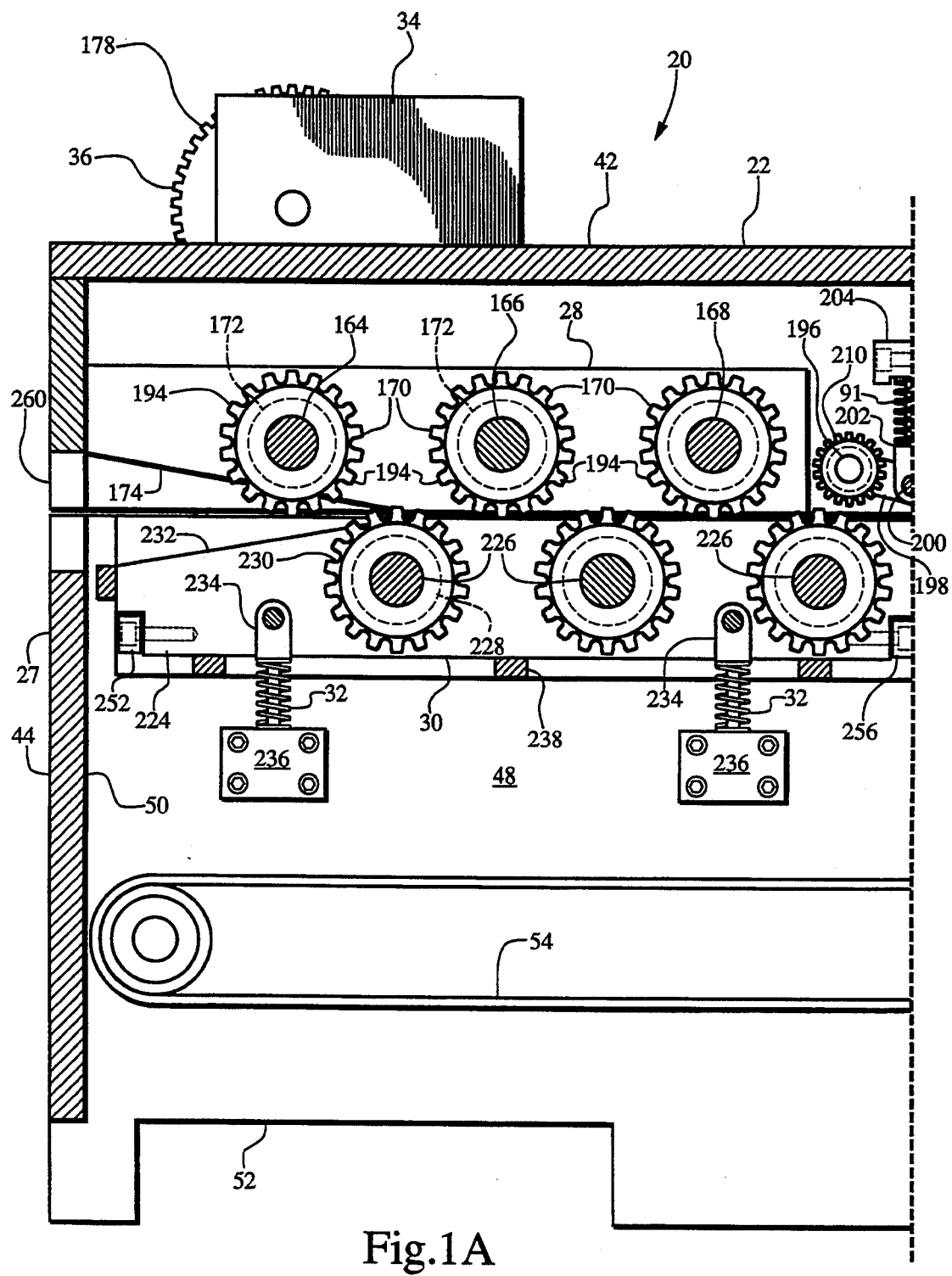
FIG. 1A is a side elevational view of the forward section of the tire recycling apparatus of this invention shown in cross-section.
Figure 1B:
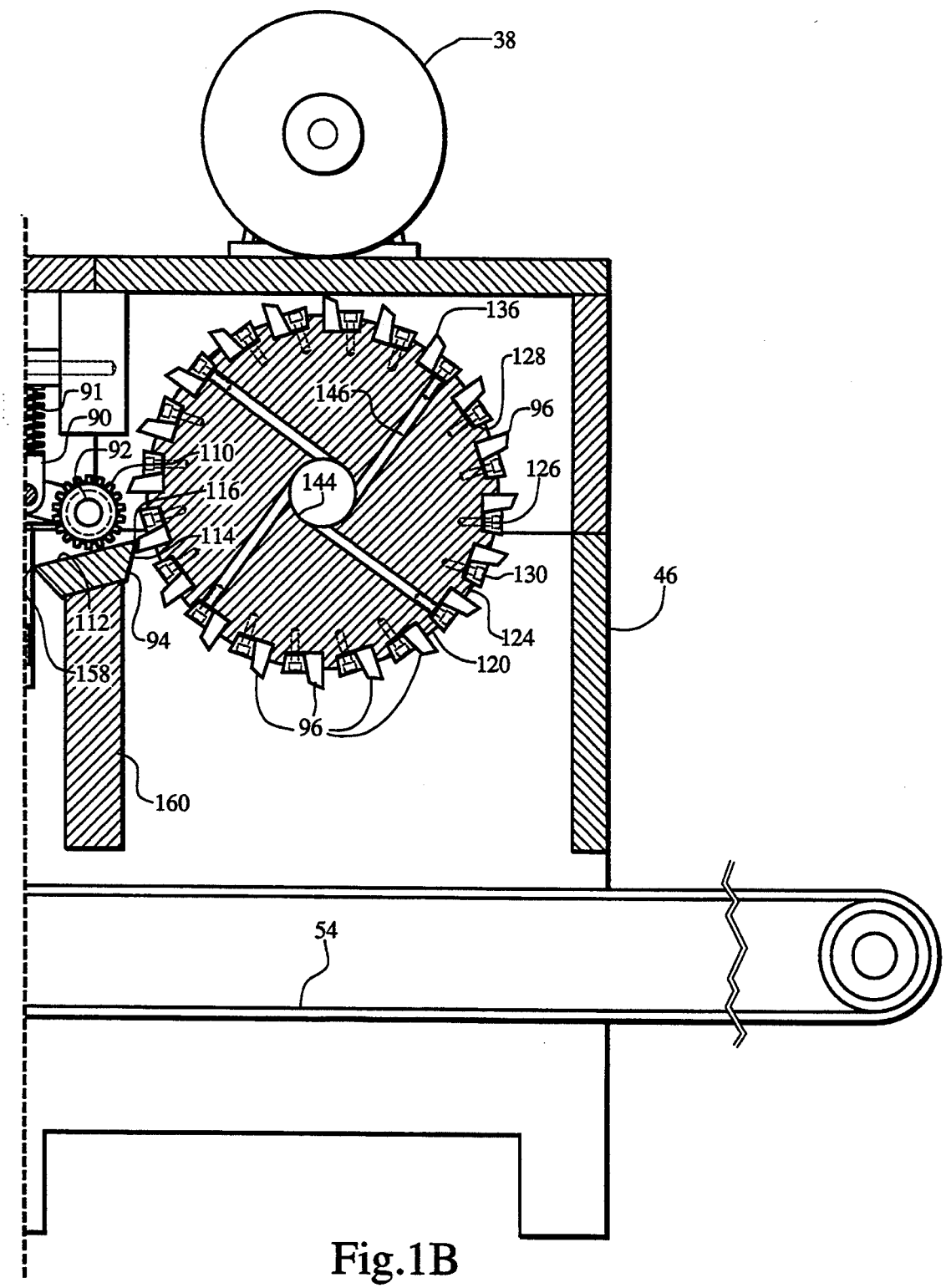
FIG. 1B is a cross-sectional view of the rear section of the tire recycling apparatus of FIG. 1A.

A portion of a cutter blade 96 is shown in FIG. 6. The blade has triangular teeth 136 which have tips 138 and roots 140. The tips 138 and the roots 140 are radiused with a radius of approximately 0.020 inches. As shown in FIG. 1B, the teeth tips 138 and roots 140 are raked or angled away from the forward, cutting edge of the blade. This rake of approximately 22.5 degrees between the front face of the cutter blade 96 and the tips 138 of the teeth, prevents the rear of the blade from rubbing against the tire 88 as it is being cut. It is desirable to avoid rubbing, which contributes to the heating of the tire but which does not contribute to cutting of the rubber. The front face of the cutter blade 96 defines a plane which intersects the axis of the rotary blade assembly shaft.

Each cutter blade 96, as shown in FIGS. 5 and 9, is off-set from adjacent cutter blades by half a tooth width. Thus, as the splayed tire 88 is advanced between the blades 94, 96, the leading edge 106 of the tire, as shown in FIG. 9, develops small, triangular projections 142 which over-hang the cutting edge 116 of the cutter bar 94. The triangular projections 142 are, because of the off-set cutter blades 96, approximately one-half the size of the triangular teeth 136.

The cutter blades 96 are mounted on the shaft 120, which is solid except for a central cavity 144 and water passageways 146. Because the rotary shaft 120 is constructed of solid steel, it functions as a fly-wheel which stores kinetic energy. This helps to keep the shaft 120 rotating at a near-constant speed. The speed of the shaft in an exemplary device 20 is 1,650 RPM. The high speed of rotation combined with the use of multiple blades 96 helps to drive up the characteristic frequency of any chatter caused by the blades intermittently cutting at the tire 88 to a frequency which is readily damped out.

For example, one would typically expect a drive rotating at 1,650 RPM with twenty blades to oscillate at 550 Hz. This frequency would typically be well above the characteristic or resonant frequency of the tire recycling apparatus 20. In order to resist the vibration and stiffen the overall structure, the top plates 42 are made of 1" thick steel plate which is closely machined to fit the frame and are joined to the frame by steel dowels (not shown). The side plates 48 are constructed of 1¾ incher steel plate. The front plates 44 and the rear plates 46 are constructed of 1" steel plate. The use of heavy-gauge cover plates as well as massive structural elements results in a tire grinding apparatus with an overall weight of 4,000 to 5,000 lbs. which advantageously resists and prevents amplification of the vibration produced by the discontinuous nature of the cutting operation of the cutter blades 96 of the recycling apparatus. The dimensions of the apparatus 20 make it transportable.

In order to reduce the tires 88 to a fine particulate, it is necessary to control the rate of feed of the tires 88. This may be done with the variable-speed motor 34, which controls the tip velocity of the infeed drive sprockets 170, the upper infeed assembly 28, and the final drive sprockets 110 in the tire-feed assembly 90. The DC motor 34 is controlled so that the tire 88 is moved towards the rotary blade assembly 24 at a rate of between six inches and 36 inches per minute with tires ranging in thickness between ⅜ inch and 12/8 inch thick. Taking into consideration the range of infeed speeds and the speed of rotation of the rotary blade assembly, 1,650 RPM, combined with the tact that the twenty off-set cutter blades 96 allow the tire to move forward for 1/20 of a revolution between subsequent cuts, we can derive a rate of tire advancement per cut ranging between 0.00018 inches and 0.0011 inches for tires in the range of ⅜ inch to 12/8 inch maximum thickness.

One known type of tire recycling apparatus uses a tire feed rate of 24 inches per minute into an interdigitating fixed and moving blade, wherein the moving blade rotates at 600 RPM and has 10 blade-sets. This resulting in a tire advancement per cut of four thousandths of an inch, resulting in larger tire fines.

The placement of the cutter bar 94 below the horizontal plane containing the center of rotation 118 of the rotary blade shaft 120 allows the triangular teeth 136 to move away from the leading edge 106 of the tire 88 as the teeth 136 cut through the tire 88.

Because considerable heat is produced in the shredding of tires 88, the presentment of water to the leading edge 106 of the tire 88 is important in order to provide both cooling and lubrication of the cutting process. Water is conveniently provided by filling the central shaft cavity 144 with water which then flows under centrifugally developed head through the shaft passageways 146, shown in FIGS. 1B, 2A, 2B and 8, and exits from nozzles 134, best shown in FIG. 9. The nozzles 134 not only cool the cutter blades 96 and the tire fines 56, but also produce a spray of water generally in the interior of the box 52 of the recycling apparatus 20. This spray of water helps to precipitate fines which are airborne to the bottom of the box 50, where they may be removed by the conveyor belt 54. Additionally, the cooling water keeps the hot cut particles or rubber from readhering to one another. In some circumstances, if it is desirable to concentrate the spray of water on the cutting interface between the cutter bar 94 and the cutter blades 96, a non-rotating sleeve (not shown) may be placed in the central cavity 144 to block the flow of water into the passageways 146, except when the shaft passageways are adjacent to the cutting interface between the cutter blades 96 and the cutter bar 94.

The rotary blade shaft 120 is mounted on bearings 152. The bearings in turn are mounted in adjustable mountings (not shown), such as by means of a bolt and slot arrangement, so that the alignment of the rotary blade shaft 120 may be adjusted. Adjustment may be more readily accommodated by movement of the cutter bar 94, wherein clamping bolts 154 pass through slightly oversized bolt holes 156, which allow slight adjustments in the positioning of the cutter bar 94 bring it into alignment spaced from the cutter blade 96 of the rotary blade assembly 24. The cutter bar 94 will preferably be made reversible, so that a second cutting edge 158 may be swapped with the cutting edge 116 by rotating the cutter bar 94 one hundred and eighty degrees and rebolting it to the cutter bar mount 160.

Because the cutting edge 116 of the cutter bar 94 and the cutting teeth 136 of the moving cutter blades 96 are used in a high-wear environment, any of the techniques commonly used to increase the hardness and wear-resistance of cutting tools may advantageously be used on both the cutter bar 94 and the cutter blades 96. Techniques which may be advantageously employed include case hardening, ion implantation, and cold soaking.

The rotary blade shalt 120 has a drive pulley 162, best shown in FIGS. 3A and 5, which is connected by a drive belt 40 to an AC motor 38. The use of a belt 40 to drive the rotary blade shalt 120 allows slippage between the belt 40 and the drive pulley 162. This prevents overloading of the motor 38.

Reliably feeding tires so that they can be shredded by the rotary blade assembly 24 can present considerable difficulties. Primary among these is that tires are designed when used on vehicles to have high coefficients of friction to minimize stopping distances and prevent skidding on roadway surfaces. The result of this high coefficient of friction, particularly on the treadside portion of a tire, is that it is difficult to simultaneously hold the tire in a clamped, flat position and to slide it forward.

Figure 4:
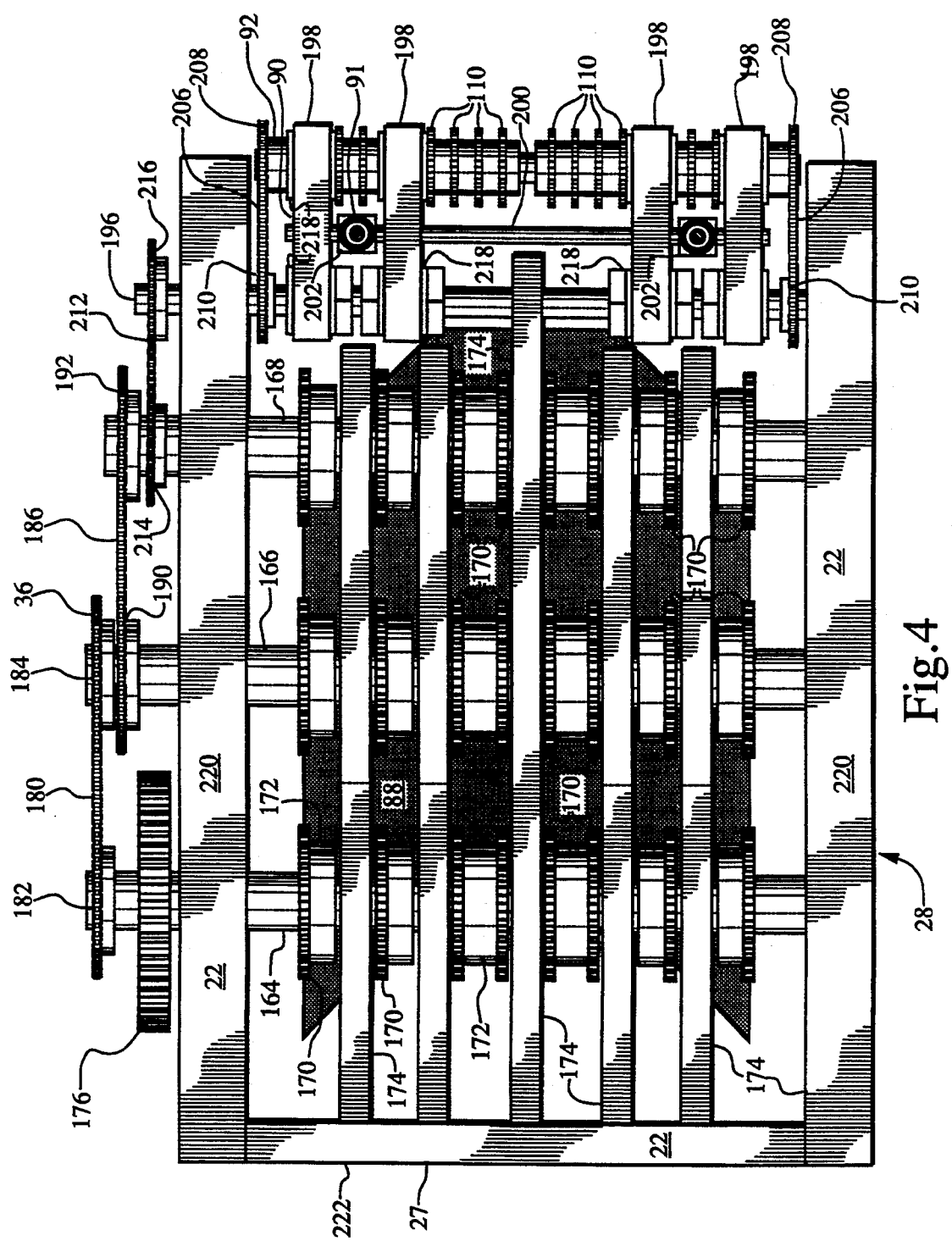
FIG. 4 is a top view of the upper infeed section of the apparatus of FIGS. 1A and 1B.

Referring to FIG. 4, wherein the upper infeed assembly 28 is shown, a first infeed drive shaft 164, a second infeed drive shaft 166, and a third infeed drive shalt 168 are mounted to the frame 22 and extend generally parallel to the axis of the rotary cutter shaft 120. The drive shafts 164, 166, 168 are mounted on beatings (not shown) so they may freely rotate. Each infeed drive shaft has eight infeed sprockets 170 which are mounted to hubs 172 which are keyed into the shafts 164, 166, 168. The central hubs mount pairs of infeed sprockets 170. Spaced between the sprockets arc infeed rails 174 which are beneath the infeed shafts 164, 166, 168 and between the sprocket wheels 170. The rails 174 provide a minimal surface over which the tires 88 are dragged by the driven sprockets 170. The sprockets arc all caused to rotate with the same tip velocity by a chain and gear drive 36. The first infeed shaft 164 is driven by a secondary gear 176, which is driven by the primary gear 178, best shown in FIG. 3B, which is mounted to the DC variable speed motor 34.

As shown in FIG. 4, the second infeed drive shall 166 is driven from the first shaft 164 by a first chain 180 which extends between a sprocket 182 on the first shaft 164, and a sprocket 184 on the second shaft 166. The third shaft 168, in turn, is driven by a second chain 186, which is mounted between a sprocket 190 on the second infeed shaft 166 and a sprocket 192 on the third shalt 168. The shafts 164, 166 and 168 are all driven at the same speed, and the diameter of the sprockets 170 is the same on the shafts 164, 166, 168. Thus, a tire is engaged in a non-slipping relation by the sprocket teeth 194, shown in FIGS. 1A, 2A, and 2B.

The tire-feed assembly 90, shown in FIG. 4, is mounted at the end of the infeed assembly 28 opposite the tire infeed 27. The tire-feed assembly 90 includes a pivot shall 196 which extends through four pivot links 198. The pivot shaft 196 extends horizontally approximately parallel to the infeed shafts 164, 166, 168. The pivot links 198 extend towards the rotary cutter assembly 24 and join the pivot shaft 196 to the generally parallel cutter infeed shaft 92. A pivot bar 200 extends between and joins the pivot links 198. Two biasing links 202 extend vertically upwardly from the pivot bar 200 and are pivotally mounted at their lower ends to the pivot bar ms shown in FIG. 2A. The upper ends of the biasing links extend through two biasing frame brackets 204 which are fixed to the apparatus frame 22. A spring 91 surrounds the shaft of each biasing link 202 and engages against the underside of a frame bracket 204 and a lower lip of the pivot link 198 to bias the pivot bar 200 downwardly. As the axis of the pivot shaft 196 is fixed, the downward biasing of the pivot bar 200 causes the cutter infeed shaft 92 to pivot downwardly about the pivot shaft 196, thus clamping a tire 88 between the final sprockets 110 and the cutter bar 94.

It is important to note that the tire-feed assembly 90 is in driving contact with the tire until it is gripped by the cutter blades of the rotary blade assembly. The downward and forward pressure of the tire-feed assembly prevents the fed tire from loosing contact with the cutting edges and insures a constant feed rate.

Referring to FIG. 4, the cutter infeed shaft 92 is caused to rotate by a pair of drive chains 206 which extend between sprockets 208 on the cutter infeed shall 92 and sprockets 210 on the pivot shaft 196. The pivot shaft 196, in turn, is driven by an intermediate drive chain 212 which connects the sprocket 214 on the third infeed shall 168 with the sprocket 216 on the pivot shaft 196. The sprocket 214 on the third infeed drive shaft 168, and the sprocket 216 on the pivot shaft 196, are chosen so that the gearing ratio between the two shafts ensures that the tip velocity of the infeed final sprockets 110 is the same as the tip velocity of the sprockets 170 on the first three infeed drive shafts 164, 166, 168.

The pivot links 198 are blocked for stiffness and to prevent lateral movement by rotating collars 218 fixed to the pivot shall 196. The frame 22, as shown in FIG. 4, is composed of side frame members 220 and front frame member 222. The frame members are solid structural steel. Thus, the entire frame 22, being composed of solid steel members, has added mass and stiffness. This reduces vibration and prevents vibration-induced dimensional variations which can lead to jamming in the interface between the rotary blade assembly 24 and the fixed blade assembly 26.

The lower infeed assembly 30, best shown in FIG. 7, has a rigid sub-frame 224 on which are mounted three rotatable idler shafts 226. Idler hubs 228 are keyed to the idler shafts 226. The hubs 228 are connected to idler sprockets 230. Spaced between the idler sprockets 230 are lower infeed assembly rails 232 which are opposed to the upper rails 174. The entire sub-frame is mounted on springs 32 which extend between the frame 22 and the sub-frame 224 as shown in FIG. 1A. The springs 32 resiliently bias the sub-frame 224 of the lower infeed assembly 30 against the upper infeed assembly 28 so that the opposed upper rails 174 and lower rails 232 are biased together. Thus a tire 88 is held in the flat-splayed condition shown in FIG. 7, and caught between the rails, as shown in FIG. 2B.

The lower idler shafts 226 are spaced between the upper drive sharks 164, 166, 168 and the infeed shaft 92. Thus tires 88, as shown in FIG. 2B, are driven by the upper drive shafts 164, 166, 168 and ride on the lower sprockets 230 of the lower idler shafts 226.

As shown in FIG. 2B, the springs 32 are mounted to spring holders 234 which are pinned to the sub-frame 224 and arc journaled into mounts 236 which are mounted to the frame 22. Cross-structural members 238 tie the components of the sub-frame 224 together. The sub-frame 224 is prevented from movement in the horizontal plane by a system of cam followers riding on cam surfaces. Preventing front-to-back motion are forward cam followers 240 which ride on forward cam surfaces 242 in forward cam slob 244. These are opposed by rearward cam followers 246 riding on rear cam surfaces 248 in rear cam slob 250. The opposed cam surfaces 242, 248, which are closely engaged by the cam followers 240, 246, prevent the front-to-back motion of the sub-frame 224. Opposed front-lateral cam followers 252 ride on opposed cam surfaces 254 which ride on side frame members 220 of the frame 22. Similarly, rear-lateral cam followers 256 riding on rear cam surfaces 258 prevent side-to-side motion of the sub-frame 224. Further, the arrangement of all the cam followers 240, 246, 252, 256 prevents racking or rotation of the sub-frame 224. Because the cam followers are mounted on bearings, while they resist lateral translation, they present little resistance to vertical motion by the sub-frame 224. Thus, the sub-frame 224 is tree to ride up and down on the springs 32, depending on the thickness of the tires 88 being fed between the upper tire infeed assembly 28 and the lower infeed assembly 30.

The upper guiderails 174 and lower guiderails 232 remain opposed, but open up near the infeed end 27 of the apparatus 20. Thus, tires may be led through the infeed opening 260 and are guided by the rails into the drive sprockets 170 and the idler sprockets 230. The first drive shaft 164 will normally be located so that the sprockets 170 located thereon are at least 12" inside the tire infeed inlet 260 to conform with OSHA safety regulations.

The arrow feather shape of a splayed tire 88 as shown in FIG. 5 results in tapered sidewalls 104 which allow the tire to be directly led into the tire recycling apparatus 20 without any structure being required to flatten the tire out before reaching the driven sprockets 170 and idler sprockets 230.

The apparatus 20 is sufficiently compact that it may be transported to the site of a collection of tires which await disposal, and emits sufficiently clean exhaust that it may be positioned in any desired locality. Furthermore, the apparatus 20 provides for conversion of slit tires into reusable powdered rubber in a single pass through a single machine.

It is understood that the convention is not confined to the particular construction and arrangement of parts herein illustrated and described, but embraces such modified forms thereof as come within the scope of the following claims.

I claim:

1. A tire recycling method comprising the steps of:
   a) cutting a tire having a maximum tread thickness between three-eighths inches and twelve-eighths inches diametrically and splaying the tire out flat;
   b) clamping with a downwardly biased feed mechanism the tire in a splayed position above a cutter bar;
   c) rotating an assembly of a plurality of radially extending cutter blades to cyclically bring each blade into engagement with the in-fed tire; and
   d) feeding the splayed tire positioned above the cutter bar in to the cutter blades to advance the tire in to each rotating blade such that each blade cuts between 0.00018 inches and 0.0011 inches from the tire.

2. The method of claim 1 wherein the steps of clamping and feeding are conducted in a box substantially sealed from the atmosphere and further comprising the steps of:
 a) drawing a negative pressure on the box; and
 b) discharging air removed from the box through an air cleaner.

3. The method of claim 1 wherein the splayed tires are fed at a rate of between six inches per minute and three feet per minute into a rotary blade assembly rotating at 1,650 RPM, and wherein the rotary blade assembly has 20 cutter blades.

4. The method of claim 1 further comprising the step of spraying a cooling fluid on to the cutter blades.

5. The method of claim 1 wherein the clamping step comprises clamping the tire with a tread side down.

6. A tire recycling apparatus comprising:
 a) a frame;
 b) a rotary blade assembly rotatably mounted about a shaft to the frame, the shaft defining an axis, wherein the rotary blade assembly has a plurality of cutter blades which extend radially outwardly from the shaft;
 c) a fixed blade assembly mounted to the frame and having a fixed cutter bar which extends upwardly toward the rotary blade assembly, wherein the cutter bar has a cutting edge located beneath and parallel to the rotary blade assembly shaft axis;
 d) a driven rotatable member positioned above the cutter bar and biased downwardly to clamp a cut splayed tire against the cutter bar and to feed said tire over the bar to be cut between the fixed cutter bar edge and the rotary cutter blades wherein the cutter bar has an upper surface over which a tire is fed, and a blade-forming surface positioned beneath the upper surface and meeting the upper surface at an acute angle to form a cutting edge, and wherein the upper surface of the cutter bar is angled upwardly from a horizontal plane.

7. The apparatus of claim 6 wherein the upper surface of the cutter bar is in a plane which intersects the axis of the rotary blade assembly.

8. A tire recycling apparatus comprising:
 a) a frame;
 b) a rotary blade assembly rotatably mounted about a shaft to the frame the shaft defining an axis, wherein the rotary blade assembly has a plurality of cutter blades which extend radially outwardly from the shaft;
 c) a fixed blade assembly mounted to the frame and having a fixed cutter bar which extends upwardly toward the rotary blade assembly, wherein the cutter bar has a cutting edge located beneath and parallel to the rotary blade assembly shaft axis;
 d) a driven rotatable member positioned above the cutter bar and biased downwardly to clamp a cut splayed tire against the cutter bar and to feed said tire over the bar to be cut between the fixed cutter bar edge and the rotary cutter blades, wherein the cutter blades of the rotary blade assembly have a saw-toothed profile with triangular teeth, and wherein all the teeth of a cutter blade are spaced axially from the fixed cutter bar cutting edge as the rotary cutter blade cuts a tire with the fixed cutter bar.

9. The apparatus of claim 8 wherein the rotary blade assembly has an even number of cutter blades spaced about the periphery of the rotary blade assembly shaft and wherein every other cutter blade is offset along the axis of the shaft by half a triangular blade width, thus forming triangular cuts in a tire being fed into the rotary blade which are one-half the width of each tooth.

10. The apparatus of claim 8 wherein the cutter blade teeth have a front face and tips which are raked radially inwardly from the front face.

11. The apparatus of claim 10 wherein the angle between the teeth tips and the teeth front face is approximately twenty-two degrees.

12. A tire recycling apparatus comprising:
 a) a frame;
 b) a rotary blade assembly rotatably mounted about a shaft to the frame, the shaft defining an axis, wherein the rotary blade assembly has a plurality of cutter blades which extend radially outwardly from the shaft;
 c) a fixed blade assembly mounted to the frame and having a fixed cutter bar which extends upwardly toward the rotary blade assembly, wherein the cutter bar has a cutting edge located beneath and parallel to the rotary blade assembly shaft axis;
 d) a driven rotatable member positioned above the cutter bar and biased downwardly to clamp a cut splayed tire against the cutter bar and to feed said tire over the bar to be cut between the fixed cutter bar edge and the rotary cutter blades, wherein the rotary blade assembly shaft has portions defining a central cavity which extends axially through the shaft, and wherein the shaft has portions which define passageways extending between the central cavity and the exterior of the shaft, the passageways providing a conduit for water placed within the central cavity to be pumped by the centrifugal force of the rotation of the rotary blade assembly through the passageways to be discharged from the shaft onto said cut tire.

13. A tire recycling apparatus comprising:
 a) a frame;
 b) a rotary blade assembly rotatably mounted about a shaft to the frame, the shaft defining an axis, wherein the rotary blade assembly has a plurality of cutter blades which extend radially outwardly from the shaft;
 c) a fixed blade assembly mounted to the frame and having a fixed cutter bar which extends upwardly toward the rotary blade assembly, wherein the cutter bar has a cutting edge located beneath and parallel to the rotary blade assembly shaft axis;
 d) a driven rotatable member positioned above the cutter bar and biased downwardly to clamp a cut splayed tire against the cutter bar and to feed said tire over the bar to be cut between the fixed cutter bar edge and the rotary cutter blades;
 e) a first shaft rotatably mounted to the frame;
 f) a plurality of sprockets spaced along the first shaft which engage and grip a tire, wherein the first shaft is spaced from the cutter bar in the fixed blade assembly;
 g) a second, driven, shaft connected to the first shaft, wherein the driving rotatable member is connected to the second shaft;
 h) a link which extends between and connects in pivotal relation the second shaft to the first shaft, wherein the second shaft is positioned over the fixed cutter bar spaced from the rotary blade assembly; and i) a resilient member which extends between the frame and the link at a position between the first and second shafts, wherein the resilient member downwardly biases the link, to drive the rotatable member downward to grip and advance a tire across the cutter bar into the rotary blades.

14. A tire recycling apparatus comprising:
a) a frame;
b) a rotary blade assembly rotatably mounted about a shaft to the frame, the shaft defining an axis, wherein the rotary blade assembly has a plurality of cutter blades which extend radially outwardly from the shaft;
c) a fixed blade assembly mounted to the frame and having a fixed cutter bar which extends upwardly toward the rotary blade assembly, wherein the cutter bar has a cutting edge located beneath and parallel to the rotary blade assembly shaft axis;
d) a driven rotatable member positioned above the cutter bar and biased downwardly to clamp a cut splayed tire against the cutter bar and to feed said tire over the bar to be cut between the fixed cutter bar edge and the rotary cutter blades;
e) a tire infeed assembly wherein the infeed assembly comprises:
i) a plurality of horizontally spaced upper shafts rotatably mounted to the frame;
ii) a plurality of sprockets mounted to each upper shaft to co-rotate with the shaft;
iii) a plurality of guiderails rigidly attached to the upper assembly, the upper guiderails extending perpendicular to the upper drive shafts and spaced between the sprockets mounted to the upper shafts;
iv) a subframe resiliently mounted to the frame by at least one resilient member;
v) at least one lower idler shaft located below and between two upper infeed shafts;
vi) a plurality of sprockets fixed to each lower shall;
vii) a plurality of lower guiderails mounted to the subframe beneath the upper guiderails, wherein the upper and lower sprockets have peripheral sprocket tips, and the sprockets are driven so as to have approximately the same tip velocity and wherein the lower guiderails are biased by the resilient member to engage a splayed tire against the upper guiderails, such that said tire is fed by the tire infeed assembly into the fixed and rotary cutter assemblies.

15. The apparatus of claim 14 wherein the upper drive shafts are driven by a Direct Current motor through a gear and chain drive.

16. A tire recycling apparatus comprising:
a) a frame;
b) a rotary blade assembly rotatably mounted about a shaft to the frame, the shaft defining an axis, wherein the rotary blade assembly has a plurality of cutter blades which extend radially outwardly from the shaft;
c) a fixed blade assembly mounted to the frame and having a fixed cutter bar which extends upwardly toward the rotary blade assembly, wherein the cutter bar has a cutting edge located beneath and parallel to the rotary blade assembly shaft axis;
d) a driven rotatable member positioned above the cutter bar and biased downwardly to clamp a cut splayed tire against the cutter bar and to feed said tire over the bar to be cut between the fixed cutter bar edge and the rotary cutter blades, wherein the frame defines a box having a top, sides and an end which are substantially closed off from the atmosphere by covers, and wherein the bottom of the box is formed by a conveyor belt which is operable to remove tire fines as they are moved by gravity to the bottom of the box.

17. The apparatus of claim 16 further comprising a fan in communication with the box, wherein the fan produces a negative air pressure within the box and is in communication with an air cleaner for purifying the air removed from the box.

18. The apparatus of claim 17 wherein the air cleaner further comprises:
a) an inlet connected to the fan;
b) an outlet open to the atmosphere;
c) a plurality of air baffles disposed between the air cleaner inlet and the air cleaner outlet, wherein the baffles allow the settlement thereon of particulates contained in air moving through the air cleaner;
d) at least one spray bar which discharges water within the baffles to wash particulates and soluble gasses from the air; and
e) a filter adjacent to the air outlet which removes particulates from the air exiting the air cleaner.

19. A tire recycling apparatus comprising:
a) a frame;
b) a rotary blade assembly having a shaft mounted to the frame for rotation about a substantially horizontal axis, wherein a plurality of cutter blades extend from the shaft, and wherein each cutter blade has a saw-toothed profile with adjacent triangular teeth, defining teeth points at the tips of the triangles and teeth roots between adjacent triangles, wherein the each blade has a front face and the teeth tips and roots are angled axially inwardly from the front face;
c) a fixed blade assembly mounted to the frame, the fixed blade assembly having a cutter bar, the cutter bar having a cutting edge, wherein the rotary blade tips are spaced from the bar cutting edge;
d) a tire-feed positioned above the cutter bar and biased downwardly to clamp a cut splayed tire against the cutter bar and to feed a tire over the bar and into the rotary cutter blades.

20. The apparatus of claim 19 wherein the cutter bar has an upper surface over which a tire is fed, and a blade-forming surface extends beneath the tipper surface joins the upper surface at an acute angle to form a cutting edge, and wherein the cutting edge is below the axis of rotation of the rotary blade assembly and the top surface of the cutter bar is angled upwardly from a horizontal plane.

21. The apparatus of claim 19 wherein the upper surface of the cutter bar is in a plane which intersects the axis of the rotating blade.

22. The apparatus of claim 19 wherein the rotary blade assembly shaft has a generally cylindrical periphery and wherein an even number of cutter blades are spaced about the shaft periphery, and wherein alternate cutter blade teeth are offset along the axis of the shaft by half a triangular blade width, thus forming triangular cuts in a tire being fed into the rotary blade which are one-half the width of each tooth.

23. The apparatus of claim 19 wherein the rotary blade assembly shaft has portions defining a central cavity about the axis of the shaft and wherein the shaft has portions which define passageways extending between the central cavity and the shaft periphery, the passageways providing a conduit for water placed within the central cavity to be pumped by the centrifugal force of the rotation of the rotary blade assembly through the passageways to provide cooling and lubricating to the rotary and fixed blade assemblies.

24. The apparatus of claim 19 wherein the frame defines a box and wherein the top, sides and end of the box are substantially closed off from the atmosphere by covers, and wherein the bottom of the box is formed by a conveyor belt which extends from front to back and from side to side of the frame, wherein the conveyor belt removes tire fines as they are moved by gravity to the bottom of the box.

25. The apparatus of claim 24 further comprising a fan in communication with the box, wherein the fan produces a negative air pressure within the box, and the fan is in communication with an air cleaner for purifying the air removed from the box.

26. The apparatus of claim 25 wherein the air cleaner has an inlet connected to the fan, and an outlet open to the atmosphere and further comprising:
   a) a plurality of air baffles disposed between the inlet and the outlet to allow the settlement of particulates contained in air moving through the air cleaner;
   b) a spray bar which discharges a liquid within the cleaner for washing particulates and soluble gasses from the air; and
   c) a filter adjacent to the air outlet for removal of remaining particulates from the air.

27. A tire recycling apparatus comprising:
   a) a frame which defines an interior space;
   b) a shaft mounted to the frame for rotation about an axis;
   c) a plurality of cutter blades extending outwardly from the shaft;
   d) a cutter bar which has a cutting edge, wherein the cutter blades are rotatable on the shaft to be spaced from the bar cutting edge to shred a tire to a fine powder;
   e) a tire-feed member positioned above the cutter bar and biased downwardly to clamp a cut splayed tire against the cutter bar and to feed a tire over the bar and into the cutter blades;
   f) an air cleaner mounted to the frame, the air cleaner communicating with the interior of the frame and having a fan which draws air through the cleaner from the frame interior space, wherein the frame defines a box having a top, sides and an end which are substantially closed off from the atmosphere by covers, and wherein the bottom of the box is formed by a conveyor belt which is operable to remove tire fines as they are moved by gravity to the bottom of the box.

28. A tire recycling apparatus comprising:
   a) a frame which defines an interior space;
   b) a shaft mounted to the frame for rotation about an axis;
   c) a plurality of cutter blades extending outwardly from the shaft;
   d) a cutter bar which has a cutting edge, wherein the cutter blades are rotatable on the shaft to be spaced from the bar cutting edge to shred a tire to a fine powder;
   e) a tire-feed member positioned above the cutter bar and biased downwardly to clamp a cut splayed tire against the cutter bar and to feed a tire over the bar and into the cutter blades;
   f) an air cleaner mounted to the frame, the air cleaner communicating with the interior of the frame and having a fan which draws air through the cleaner from the frame interior space, wherein the interior space is substantially closed off from the atmosphere and further comprising a fan in communication with the interior space, wherein the fan produces a negative air pressure which draws air from the interior space and exhausts it through an air cleaner, and wherein the air cleaner further comprises:
      i) an inlet connected to a fan;
      ii) an outlet open to the atmosphere;
      iii) a plurality of air baffles disposed between the air cleaner inlet and the air cleaner outlet;
      iv) at least one spray bar which discharges water within the baffles which washes particulates and soluble gases from the air; and
      v) a filter adjacent to the air outlet which removes particulates from the air exiting the air cleaner.

* * * * *